(12) United States Patent
Pittet (10) Patent No.: US 6,396,494 B1
(45) Date of Patent: May 28, 2002

(54) METHOD FOR VIRTUAL CLIPPING A THREE-DIMENSIONAL GRAPHICS IMAGE

(75) Inventor: Jean-Jacques Pittet, Wyttenbachstr (CH)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/328,000

(22) Filed: Jun. 8, 1999

(51) Int. Cl.[7] .............................................. G06F 15/00
(52) U.S. Cl. ...................................................... 345/423
(58) Field of Search ................................ 345/419, 423, 345/427, 582, 606

(56) References Cited

U.S. PATENT DOCUMENTS 4,775,946 A  * 10/1988  Anjyo ......................... 364/522

OTHER PUBLICATIONS

Caneiro et al., "Tetra–Cubes: An Algorithm to Generate 3D Isosurfaces Based Upon Tetrahedra", 1996, Anais do IX SIBGRAPI.

* cited by examiner

*Primary Examiner*—Phu K. Nguyen
(74) *Attorney, Agent, or Firm*—Woodcock Washburn LLP (57) ABSTRACT

A method for generating a three-dimensional computer graphics image; in particular, a method of generating an image of a clipped object. The object is rendered using a plurality of three-dimensional geometric shapes. In the present embodiment, the geometric shapes are tetrahedrons. One or more of the tetrahedrons is intersected by a planar surface, thereby dividing the tetrahedron into a first subvolume and a second subvolume. A new vertex is created at each intersection of the planar surface with an edge of a tetrahedron. Each vertex of the tetrahedron is categorized as lying on one side of the planar surface or the other. Each vertex lying on the side of the planar surface that is in the first subvolume is placed into a first group. The first group is used to select a set of instructions. In one embodiment, each vertex of the geometric shape is uniquely identified. Thus, the first group of vertices contains a unique combination of vertex identifiers that allow a particular set of instructions pertaining to that combination to be selected. In one embodiment, the set of instructions are contained in a lookup table. The vertices in the first group and each new vertex are connected according to the set of instructions to form three-dimensional tetrahedrons rendering the first subvolume.

24 Claims, 9 Drawing Sheets

METHOD FOR VIRTUAL CLIPPING A THREE-DIMENSIONAL GRAPHICS IMAGE

TECHNICAL FIELD

The present invention pertains to the field of computer graphics. In particular, the present invention pertains to a method for clipping three-dimensional computer graphics images that are rendered using tetrahedrons.

BACKGROUND ART

There are many applications, such as computed tomography and magnetic resonance in the medical field, in which data exist in three-dimensional scalar fields. Using three-dimensional computer graphics techniques, the data are used to define an image that can be displayed in a suitable visual form in order to facilitate the analysis, interpretation, and exchange of information.

The image is framed using geometric shapes composed of lines and polygons. The derivation of the vertices of the geometric shapes and the manipulation of these vertices to provide the image entail numerous geometric calculations so that the image portrayed on the display screen has the appearance and characteristics of a three-dimensional object. For example, the displayed object can be rotated so that it can be viewed as if from different directions. The object can also be cut or sliced ("clipped") so that its internal features can be viewed, or so that aspects of the object can be magnified or highlighted for enhanced imaging.

Figure 1A:
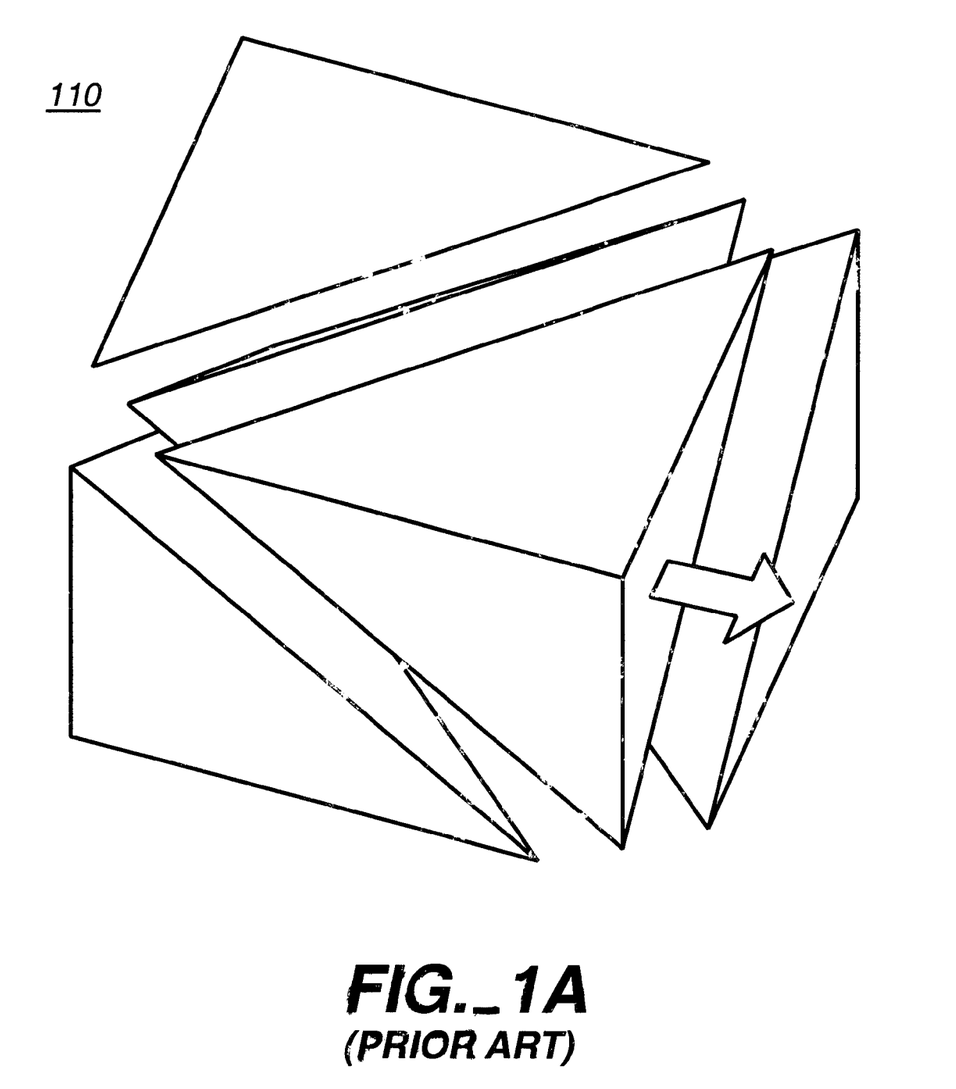
FIG. 1A is a prior art illustration of a cube defined by tetrahedrons.

With reference to Prior Art FIG. 1A, prior art techniques for displaying data in three-dimensions typically use cubes or tetrahedrons to render the object. For example, eight adjacent pixels in an image can be connected to form a cube (four pixels in each of two adjacent planes). The cube can then be divided into a collection of five tetrahedrons. Prior Art FIG. 1A is a volumetric representation of a cube 110 using five tetrahedrons. The use of tetrahedrons to represent objects in computer graphics is exemplified by the Volumizer program by Silicon Graphics, Inc. (SGI), of Mountain View, Calif.

Figure 1B:
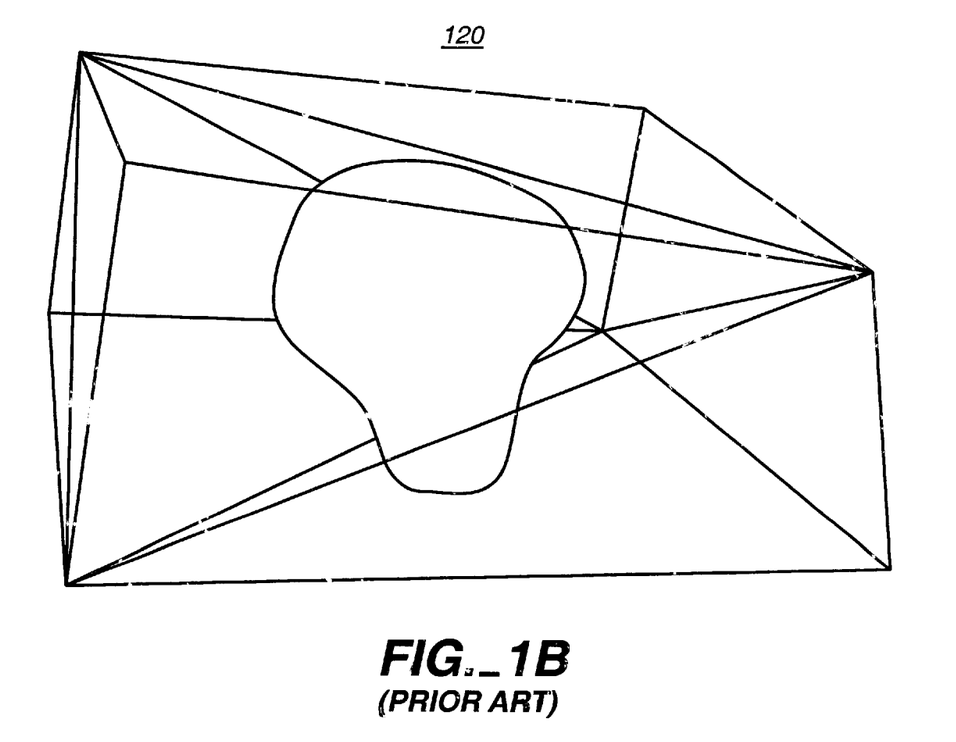
FIG. 1B is a prior art illustration of a three-dimensional object rendered using tetrahedrons.

Prior Art FIG. 1B illustrates a more complex object 120 rendered using tetrahedrons. In one prior art technique, object 120 is clipped using a graphics design program (such as OpenGL, also by SGI) executed by a graphics computer system. The user specifies what portion of object 120 is to be clipped using a known mechanism (e.g., the computer system's mouse is used to indicate where a cut is to be made). In the prior art, the graphics design program operates one by one on each of the five tetrahedrons describing object 120. The computer system then displays the resulting image.

The calculations required for clipping an object are numerous and complex. For example, consider an object rendered using a number of tetrahedrons. When a cut is made through the object, portions of each tetrahedron will have to be removed. One or more vertices will remain from the original object and one or more new vertices will be formed. In order to render the remaining object using tetrahedrons, it is necessary to compute how to connect the remaining vertices with the new vertices in order to form new tetrahedrons that render the remaining object. That is, after the clipping occurs, it is necessary to calculate how to arrange tetrahedrons in and around the remaining volume so that the remaining volume is accurately depicted. The computations needed to complete these calculations are mathematically complex and time consuming. The difficulties associated with these computations also limit the complexity of the clipped objects that can be rendered.

Typically, the preference is to perform these graphics calculations rapidly so that the resultant image is displayed as quickly as possible. Consequently, in the prior art, hardware solutions (such as processors and computer systems) are designed specifically to execute graphics programs rapidly in order to accelerate graphics calculations.

Unfortunately, these prior art hardware solutions are not capable of providing analytical information pertaining to the clipping operation. For example, the coordinates of the points where cuts are made cannot be provided, nor are the coordinates stored in memory so that they can be subsequently retrieved. However, in some cases it is desirable that the analytical information pertaining to the clipping operation be available or retrievable. For instance, that information could be stored in a database for subsequent retrieval and use.

Another problem with the prior art techniques is that, after the clipping operation is performed, only the portion of the object that remains is available to be displayed to the user. The portion of the object that was removed cannot be retrieved and displayed.

In Carneiro et al., "Tetra-Cubes: An algorithm to generate 3D iso-surfaces based upon tetrahedra" (SIBGRAPI, October 1996), a technique is described for generating iso-surfaces from data represented using tetrahedrons. However, that technique is for generating surfaces represented as triangles. The technique described by Carneiro et al. is not applicable to the more complex problem of rendering three-dimensional volumes using tetrahedrons. In particular, Carneiro et al. is not applicable to the more complex case where new tetrahedrons need to be computed in order to render an object that has been clipped from another object.

Accordingly, what is needed is a mechanism for clipping virtual objects that provides to the user or stores in a database the analytical information resulting from the clipping operation. What is further needed is a mechanism that accomplishes the above and also functions quickly and efficiently to calculate geometric shapes (e.g., tetrahedrons) for accurately rendering a clipped object as well as the portion of the object that is removed. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a mechanism for clipping virtual objects that makes available to the user or stores in a database the analytical information resulting from the clipping operation. The present invention also functions quickly and efficiently to calculate geometric shapes (e.g., tetrahedrons) for accurately and rendering a clipped object as well as the portion of the object that is removed.

The present invention pertains to a method for generating a three-dimensional computer graphics image. In particular, the present invention pertains to a method for generating an image of a clipped object.

The object is rendered using a plurality of three-dimensional geometric shapes. In the present embodiment, the geometric shapes are tetrahedrons. In the present embodiment, one or more of the tetrahedrons is intersected by a planar surface, thereby dividing the tetrahedron into a first subvolume and a second subvolume. That is, the volume is clipped, and a portion of the object is removed. In this case, the first subvolume contains the portion of the object that is retained and the second subvolume contains the portion of the object that is removed.

A new vertex is created at each intersection of the planar surface with an edge of a tetrahedron. Each vertex of the tetrahedron is categorized as lying on one side of the planar surface or the other. Each vertex lying on the side of the planar surface that is in the first subvolume is placed into a first group.

The first group is used to select a set of instructions. In one embodiment, each vertex of the geometric shape is uniquely identified. Thus, the first group of vertices contains a unique combination of vertex identifiers that allow a particular set of instructions pertaining to that combination to be selected.

In one embodiment, the set of instructions are contained in a lookup table. The vertices in the first group and each new vertex are connected according to the set of instructions to form three-dimensional tetrahedrons rendering the first subvolume (e.g., the portion of the volume that is retained).

In one embodiment of the present invention, the set of instructions also specify which edges of the geometric shape are intersected by the planar surface.

In one embodiment, each vertex of the geometric shape categorized as lying on the other side of the planar surface (e.g., in the second subvolume) is placed into a second group. The second group is used to select a second set of instructions pertaining to the unique combination of vertex identifiers in the second group. The vertices in the second group and each new vertex are connected according to the set of instructions to form three-dimensional geometric shapes rendering the second subvolume (e.g., the portion of the volume that was removed).

The present invention thus provides an analytical approach for clipping an object. Consequently, the results generated in accordance with the present invention can be stored in a database and subsequently retrieved. The set of instructions specifying how vertices are to be connected to render a clipped object are computed beforehand and, in one embodiment, stored in a lookup table. Because the instructions are computed beforehand and readily retrieved from the lookup table, complex and time consuming calculations do not need to be repeatedly performed, and new tetrahedrons are quickly and efficiently calculated. Accordingly, the present invention permits complex objects to be represented after clipping.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering," "intersecting," "categorizing," "using," "connecting," "assigning" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention pertains to a method for clipping a three-dimensional graphics object represented by a plurality of geometric shapes such as tetrahedrons. In particular, the present invention pertains to a method for quickly generating an image of a clipped object. The present invention method enables new tetrahedrons representing the clipped object to be efficiently and quickly generated.

Figure 2:
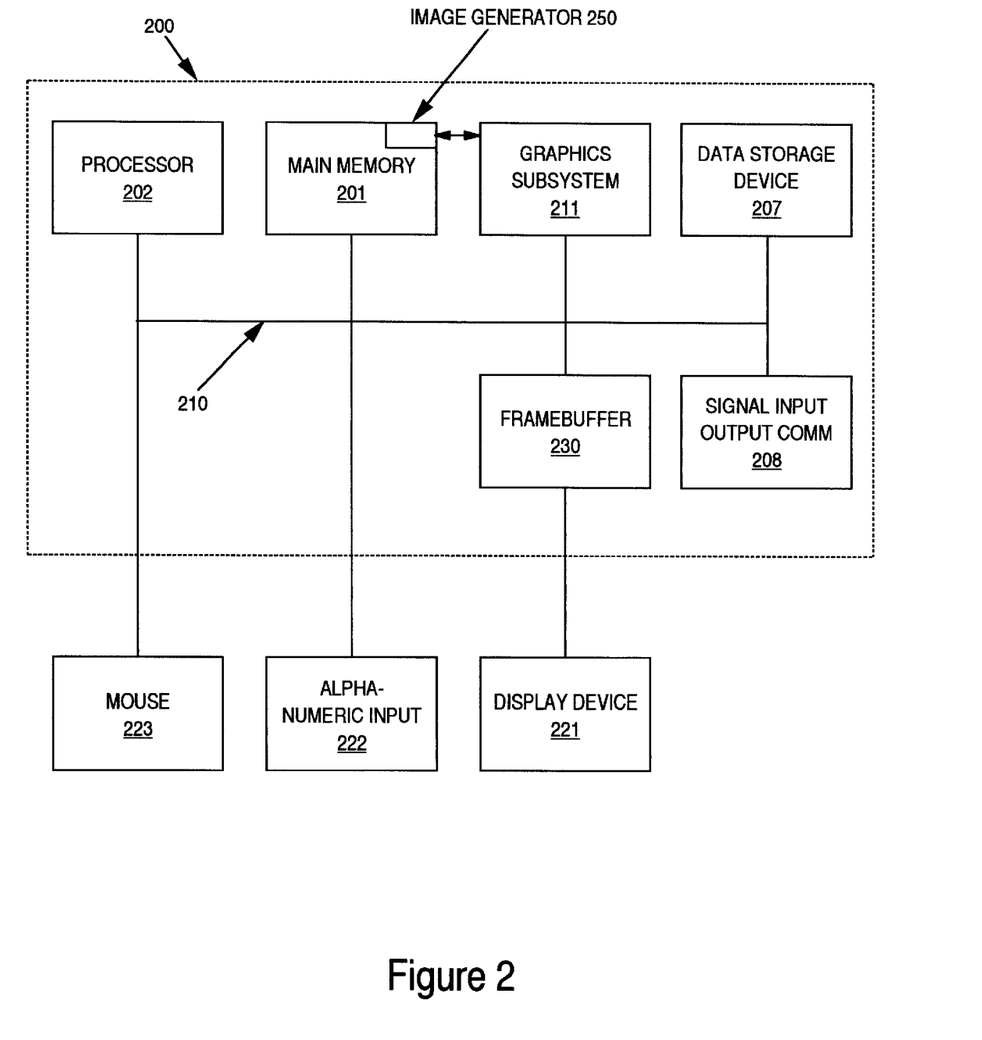
FIG. 2 is a block diagram of a computer system for performing computer graphics calculations in accordance with one embodiment of the present invention.

FIG. 2 is a block diagram of graphics computer system 200 upon which the present embodiment of the present invention can be implemented. Computer system 200 exemplifies a computer-controlled graphics systems for generating complex or three-dimensional images.

Computer system 200 comprises a bus or other communication means 210 for communicating information, and a processor 202 coupled with bus 210 for processing information. Computer system 200 further comprises a random access memory (RAM) or other dynamic storage device (main memory 201) coupled to bus 210 for storing information and instructions to be executed by processor 202. Main memory 201 also may be used for storing temporary variables or other intermediate information during execution of instructions by processor 202. Data storage device 207 is coupled to bus 210 and is used for storing information and instructions. Data storage device 207 is a device such as a magnetic or optical disk and disk drive, or the like. Signal input/output (I/O) communication device 208 is used to couple computer system 200 onto, for example, a network.

Computer system 200 can also be coupled via bus 210 to an alphanumeric input device 222, including alphanumeric and other keys, which is used for communicating information and command selections to processor 202. Another type of user input device is mouse 223 (or a like device such as a trackball or cursor direction keys) which is used for communicating direction information and command selections to processor 202 and for controlling cursor movement on display device 221. This input device typically has two degrees of freedom in two axes, a first axis (e.g., x) and a second axis (e.g., y), which allows the device to specify positions in a plane.

In accordance with the present invention, also coupled to bus 210 is graphics subsystem 211. Processor 202 provides graphics subsystem 211 with graphics data such as drawing commands, coordinate vertex data, and other data related to an object's geometric position, color, and surface parameters. In general, graphics subsystem 211 processes the graphical data, converts the graphical data into a screen coordinate system, generates pixel data (e.g., color, shading, texture) based on the primitives (e.g., points, lines, polygons, and meshes), and performs blending, anti-aliasing, and other functions. The resulting data are stored in framebuffer 230. A display subsystem (not shown) reads framebuffer 230 and displays the image on display device 221.

In accordance with the present embodiment of the present invention, main memory 201 incorporates image generator 250. In the present embodiment, image generator 250 comprises one or more lookup tables (LUTs) containing information for rendering a clipped object. Image generator 250 also comprises computer-readable program instructions used to execute the process for rendering a clipped object (see FIG. 6). As will be explained below, in combination with graphics subsystem 211, image generator 250 generates new tetrahedrons for rendering a clipped object. It is appreciated that, in other embodiments, image generator 250 may be implemented in graphics subsystem 211 or via data storage device 207.

Figure 3:
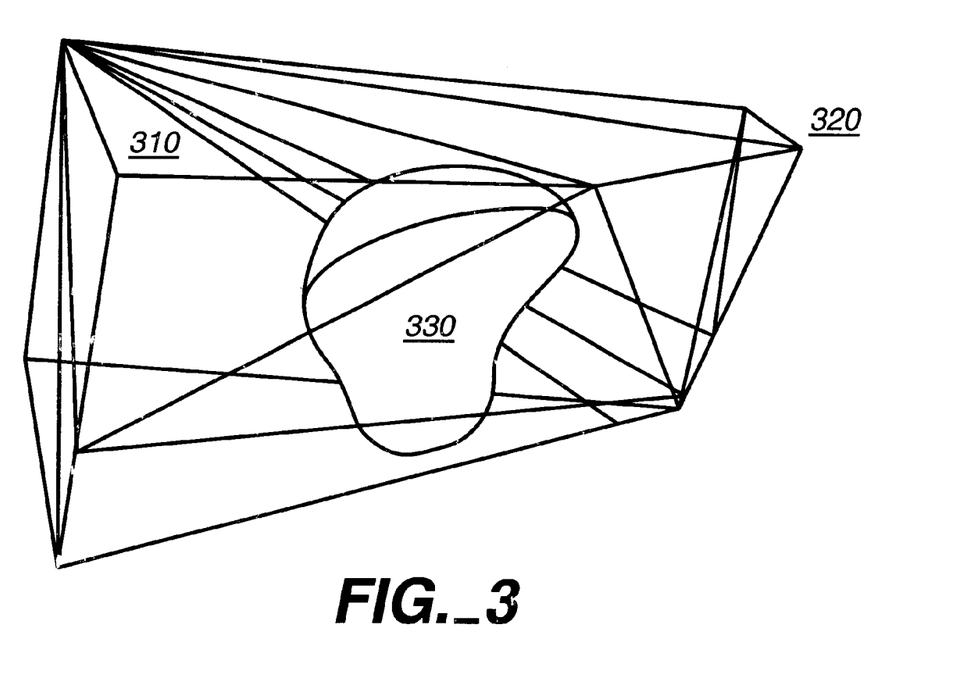
FIG. 3 is an illustration of an object rendered using tetrahedrons and clipped in accordance with one embodiment of the present invention.

FIG. 3 exemplifies an object that is clipped in accordance with the present embodiment of the present invention and rendered using a plurality of tetrahedrons. Tetrahedron 310 exemplifies one tetrahedron used to render clipped object 330. Tetrahedron 310 is formed in accordance with the present invention when clipped object 330 is intersected by planar surface 320.

To simplify the discussion herein, the present invention is described in the context of an object rendered using a single tetrahedron. From the discussion it will be apparent that the case in which a clipped object is rendered using a single tetrahedron is readily extrapolated to the case in which a clipped object is rendered using multiple tetrahedrons (as illustrated by FIG. 3). That is, in accordance with the present invention, each tetrahedron that is used to render an object is treated individually in the clipping operation. Each tetrahedron can be treated either in series or in parallel with other tetrahedrons, and the results can then be combined to render the clipped object.

Figure 4:
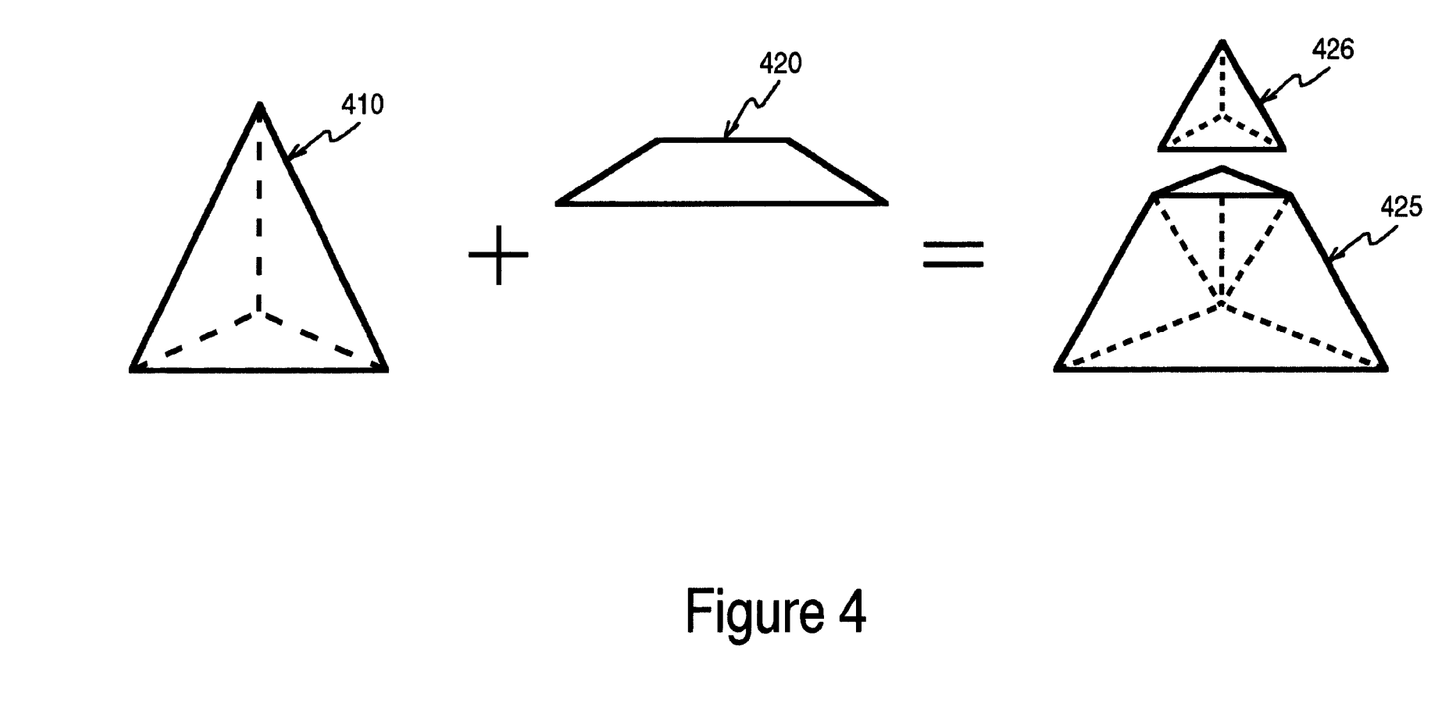
FIG. 4 illustrates an example of a tetrahedron intersected by a planar surface in accordance with one embodiment of the present invention.

FIG. 4 illustrates an exemplary tetrahedron 410 intersected by planar surface 420 in accordance with the present embodiment of the present invention. In accordance with the present invention, tetrahedron 410 and planar surface 420 are mathematically represented using a known method (e.g., a graphics program). A user specifies where tetrahedron 410 is to be clipped using a known mechanism (for example, mouse 223 of FIG. 2 is used to indicate where an image is to be clipped). The graphics program (or the like) calculates where the intersection between tetrahedron 410 and planar surface 420 is to occur.

As a result of the intersection with planar surface 420, tetrahedron 410 is separated into clipped object 425 (representing the portion of tetrahedron 410 that remains after clipping) and removed volume 426 (representing the portion of object 410 that is removed). As will be seen by the discussion below, planar surface 420 can intersect tetrahedron 410 at any angle and at any geometric position in accordance with the present invention, thereby forming two subvolumes of any shape (refer to FIGS. 5B and 5C).

Referring still to FIG. 4, either or both of clipped object 425 and removed volume 426 can be rendered using new tetrahedrons that are each derived in accordance with the present invention. That is, the present invention is used to derive one or more new tetrahedrons that render clipped object 425 so that an image of the remaining object can be displayed or operated on further. In addition, the present invention can be used to derive another group of one or more new tetrahedrons that render removed volume 426 so that an image of this portion of the object can also be displayed or operated on further.

Figure 5A:
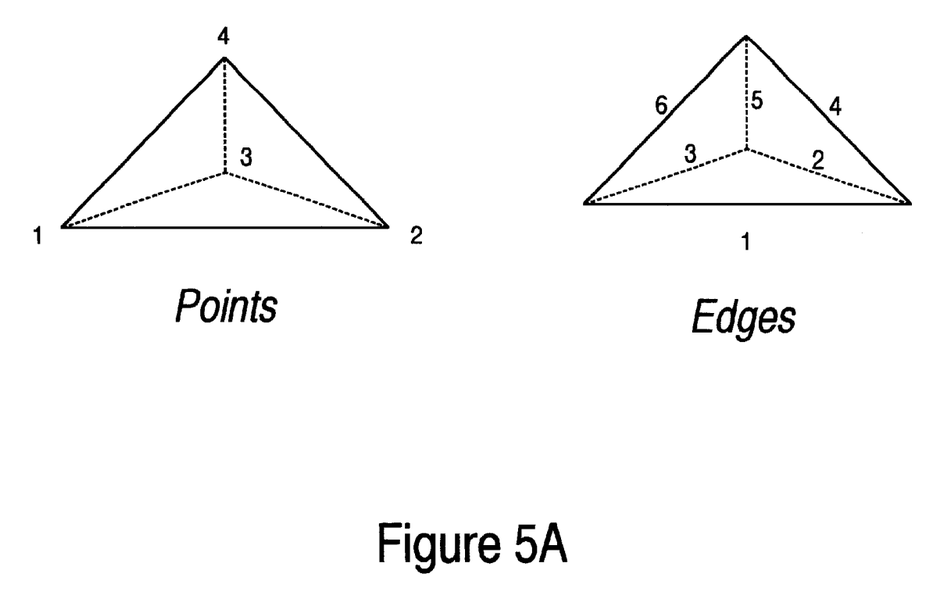
FIGS. 5A, 5B and 5C illustrate possible combinations of vertices and edges resulting from the intersection of a planar surface and a tetrahedron in accordance with one embodiment of the present invention.

FIG. 5A introduces a standard scheme for uniquely identifying each of the vertices and edges in a tetrahedron (e.g., tetrahedron 410 of FIG. 4) in accordance with the present embodiment of the present invention. It is appreciated that other schemes may be used to uniquely identify the vertices and edges in accordance with the present invention.

Figure 5B:
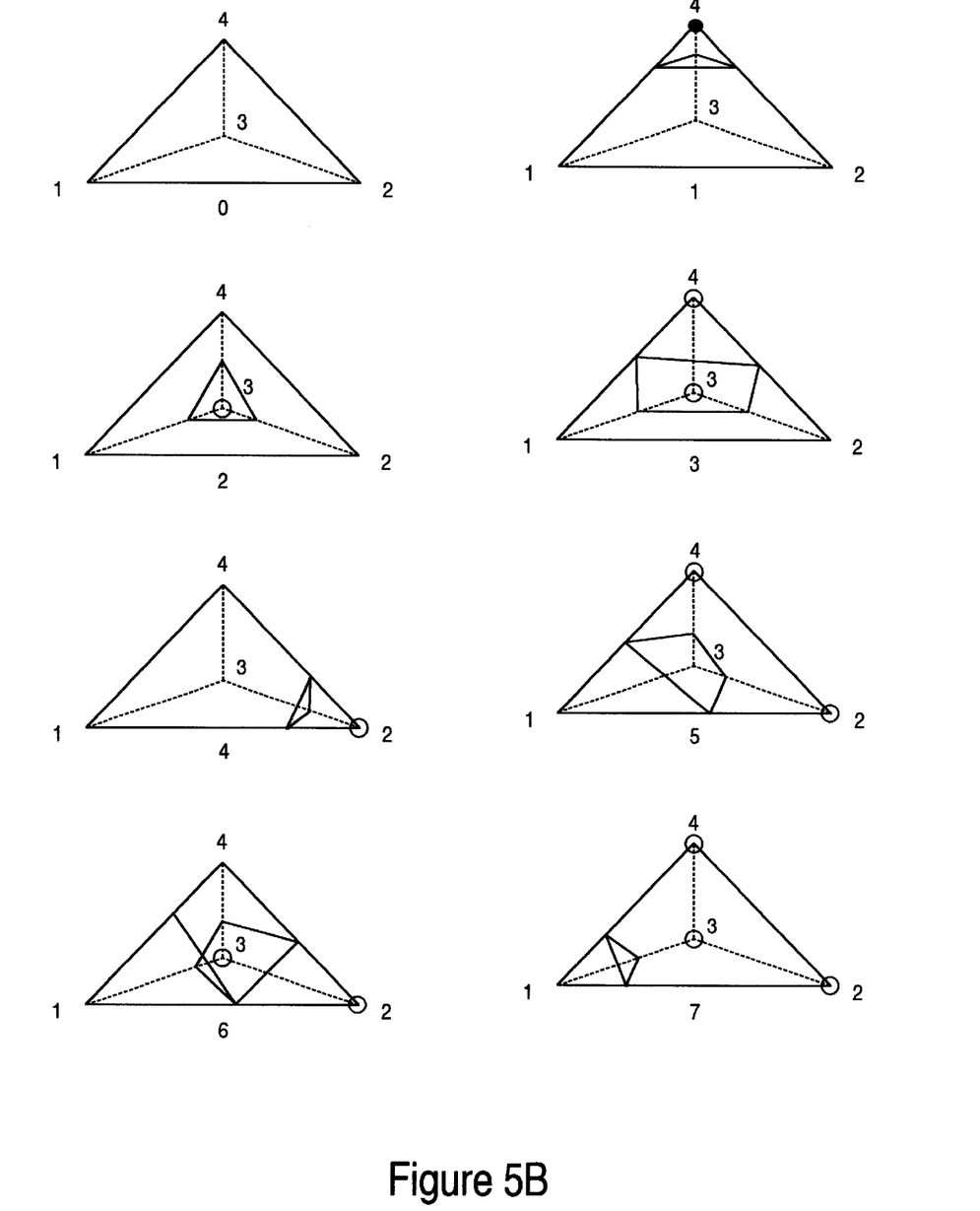
Figure 5C:
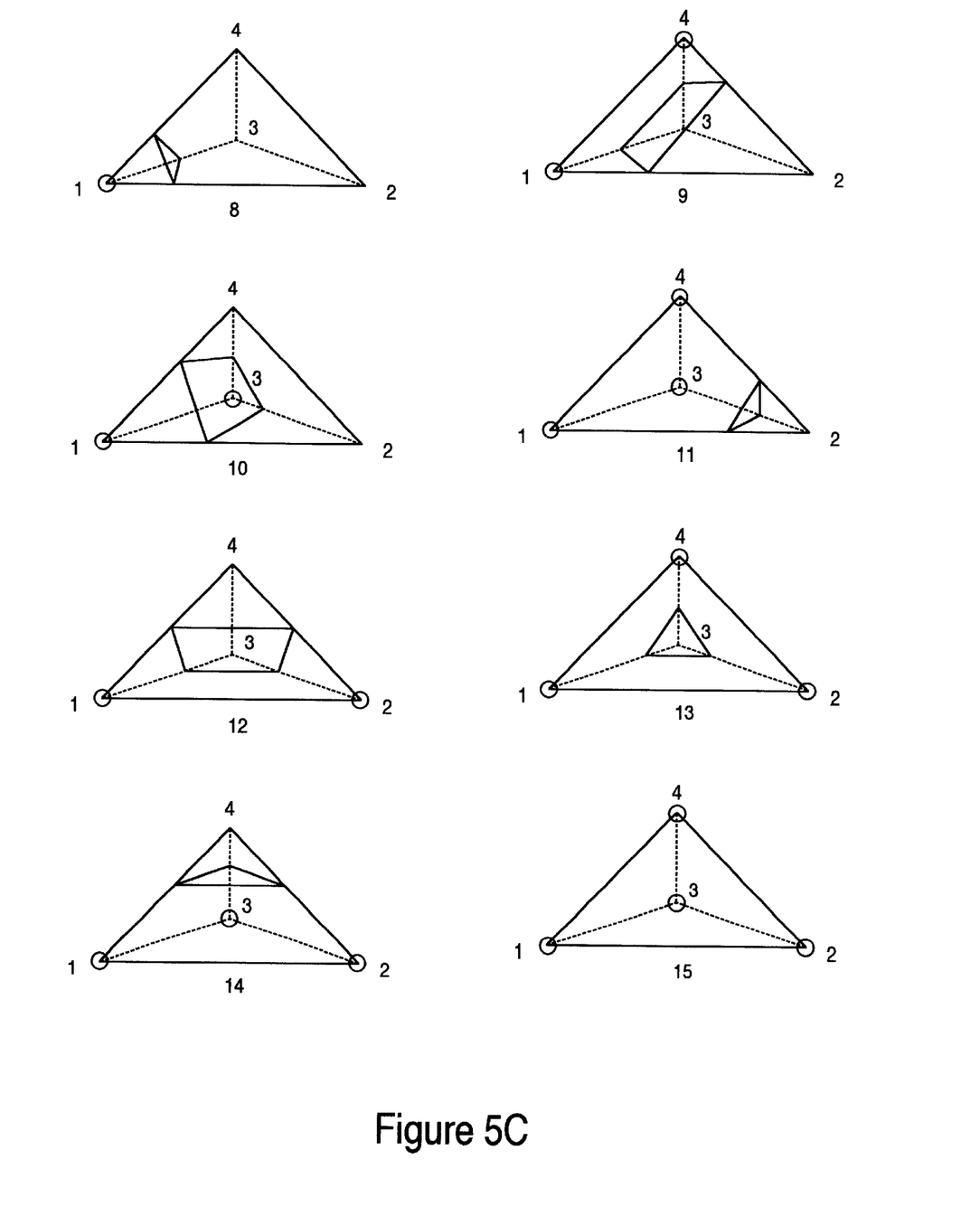

FIGS. 5B and 5C illustrate the combinations of vertices in clipped object 425 (FIG. 4) that are possible as a result of the intersection of a planar surface (e.g., planar surface 420 of FIG. 4) and a tetrahedron (e.g., tetrahedron 410). FIGS. 5B and 5C illustrate 16 possible combinations of vertices, referred to as cases 0 through 15. The possible combinations include the case in which tetrahedron 410 remains completely intact (that is, no portion of the tetrahedron is removed) and the case in which tetrahedron 410 is completely removed.

FIGS. 5B and 5C also implicitly illustrate the combinations of vertices that are possible in removed volume 426. That is, for each combination of vertices illustrated in FIGS. 5B and 5C for clipped object 425, the inverse of each combination makes up the combination of vertices present in removed volume 426. For simplicity of the discussion herein, the present invention is discussed in the context of the combination of vertices remaining in clipped object 425.

FIGS. 5B and 5C also illustrate which edges are cut by the intersection of tetrahedron 410 with planar surface 420 for each of the possible combinations of vertices present in clipped object 425 (and implicitly in removed object 426).

In accordance with the present embodiment of the present invention, the information in FIGS. 5A, 5B and 5C is stored in one or more lookup tables (LUTs) in main memory 201 (e.g., image generator 250) of FIG. 2; however, it is appreciated that in other embodiments, the LUTs may be implemented in graphics subsystem 211 or via data storage device 207 of FIG. 2. Each LUT can be accessed by graphics subsystem 211 (FIG. 2). For each tetrahedron clipped during the clipping operation, the appropriate combination of remaining vertices is selected from a LUT. For each combination of vertices, the LUTs also contain an associated set of instructions that specify how the remaining vertices are to be connected to each new vertex. Thus, the LUTs are also used to generate new tetrahedrons for rendering the remaining volume (e.g., clipped object 425 of FIG. 4) and, if desired, the volume removed (e.g., removed volume 426 of FIG. 4).

Thus, in accordance with the present invention, for each case in FIGS. 5B and 5C, the information required to connect the new vertices and the remaining vertices in order to form tetrahedrons that render the remaining volume is already computed and stored in image generator 250. Because the information is already computed, it is not necessary to repeatedly perform complex and time consuming geometry calculations in order to form new tetrahedrons. Thus, the clipping operation can be performed quickly and efficiently. In addition, the results from image generator 250 are readily stored in a database for example, so that they can be subsequently retrieved and operated on further if desired.

With reference to FIGS. 5A–C and also to FIG. 2, the use of the LUTs in image generator 250 in accordance with the present embodiment of the present invention is illustrated by the following example. A tetrahedron is clipped by a planar surface such that point 3 of the tetrahedron lies on one side of the planar surface (the side that is being removed) and points 1, 2 and 4 of the tetrahedron lie on the other side (the side that will remain) (the points are labeled per FIG. 5A). The present invention uses the combination of remaining vertices (that is, the combination of points 1, 2 and 4) to select case 2 (see FIG. 5B). In the present embodiment, a LUT and associated program instructions are used to associate the unique combination of remaining vertices with a particular case.

Continuing with this example, the intersection of the planar surface with the tetrahedron creates three new vertices on edges 2, 3 and 5 (the edges are labeled per FIG. 5A). In the present embodiment of the present invention, a LUT and associated program instructions are used to identify which edges in case 2 are intersected by the planar surface. The three new vertices are shown as points a, b and c in case 2 of FIG. 5B. The present invention thereby identifies on which edges the new vertices lie.

Continuing still with the example, a LUT (e.g., image generator 250) and associated program instructions are used to specify how to connect the remaining vertices 1, 2 and 4 with the new vertices a, b and c in a manner that creates new tetrahedrons that render the remaining volume.

It is appreciated that the technique described above for the remaining volume can also be readily applied to render the volume of the object that is removed. It is also appreciated that the technique described above for a single tetrahedron can be readily applied to each of the tetrahedrons that are used to render an object; for multiple tetrahedrons, each tetrahedron is treated individually either in parallel with the other tetrahedrons or in series, and the results are combined to render the clipped object.

Figure 6:
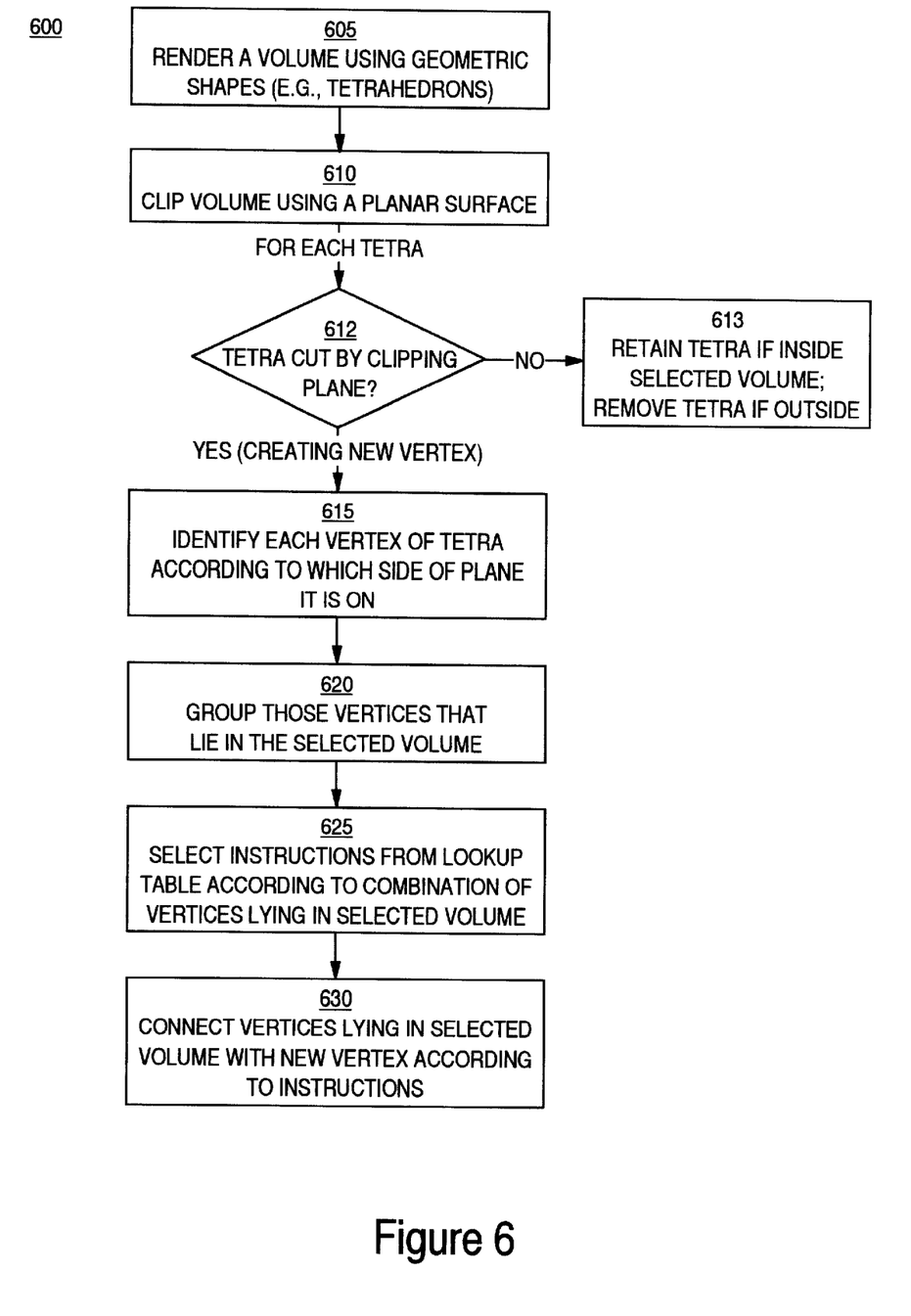
FIG. 6 is a flowchart illustrating the process for clipping an object in accordance with one embodiment of the present invention.

FIG. 6 is a flowchart illustrating process 600 for clipping an object in accordance with the present embodiment of the present invention. Process 600 is implemented as program instructions stored in computer-readable memory units (e.g., LUTs in image generator 250 of FIG. 2) of a computer system (e.g., computer system 200 of FIG. 2) and executed by processor 202 (FIG. 2).

In step 605 of FIG. 6, an object (e.g., a volume) is rendered by one or more tetrahedrons and displayed as a three-dimensional object on display device 221 (FIG. 2) using any of a number of known graphics programs.

In step 610 of FIG. 6, in response to user input, the volume is clipped by a planar surface. For example, a user uses a mouse to select a portion of the volume to be retained by indicating where the volume is to be clipped. Graphics subsystem 211 (FIG. 2) uses a known technique to compute the intersection of the planar surface and the volume. The cutting plane is thus described mathematically.

In step 612 of FIG. 6, each tetrahedron intersected by the planar surface and each tetrahedron that is not intersected are identified. Each intersection of a tetrahedron and the planar surface creates one or more new vertices at the point of intersection.

In step 613 of FIG. 6, each tetrahedron that is not intersected by the clipping plane is treated according to whether it lies inside the selected volume (the portion of the volume to be retained) or outside the selected volume. If the tetrahedron lies inside the selected volume, it is retained; if it lies outside the selected volume, it is removed. In one embodiment of the present invention, the geometrical information pertaining to each removed tetrahedron is stored in a database so that it can be subsequently retrieved and operated on further; for example, the stored information can be used to model and display the removed portion of the volume.

In step 615 of FIG. 6, for each of the tetrahedrons intersected by the clipping plane, the vertices that make up that tetrahedron are identified according to which side of the plane they lie on. That is, for each tetrahedron, the vertices that lie in the subvolume that is to be retained are identified as such, and the vertices that lie in the subvolume that is to be removed are also identified accordingly. In one embodiment, a binary value (either 0 or 1) is assigned to each vertex to indicate which category it is in.

In step 620, for each tetrahedron, those vertices that lie on the side of the plane representing the subvolume that is to be retained are placed in a first group, and those vertices that lie on the side of the plane representing the subvolume that is to be removed are placed in a second group. In accordance with the present embodiment of the present invention, each vertex in a tetrahedron is uniquely identified (see FIG. 5A). Thus, for each tetrahedron, the first group and the second group each contain a unique combination of vertex identifiers.

In step 625 of FIG. 6, in the present embodiment, for each tetrahedron in the subvolume that is to be retained, the unique combination of vertex identifiers in the first group is used to select from a LUT a particular set of instructions corresponding to that combination. That is, for each of the possible combination of vertices, there is an associated set of instructions that are accessible via a LUT. For each tetrahedron, the instructions specify how to connect the vertices in the first group and the new vertex (or vertices) formed by the intersection of the planar surface and the tetrahedron.

In step 630, for each tetrahedron, the vertices contained in the first group and the new vertex (or vertices) are connected according to the instructions. When the vertices are connected according to the instructions, new tetrahedrons are formed that render the selected volume (the volume that was retained).

It is appreciated that process 600 can also be utilized to form tetrahedrons to render the portion of the volume that was clipped away. In this case, the unique combination of vertices contained in the second group of vertices (see step 620) are used to select a particular set of instructions corresponding to that combination. The vertices in the second group and the new vertex (or vertices) are connected according to the instructions to form tetrahedrons that render the portion of the volume that was removed.

It is also appreciated that process 600 can be used to cut multiple tetrahedrons either sequentially or in parallel, and that process 600 can be used with multiple cutting planes. The results can then be combined and manipulated to render a clipped object.

The results from process 600 are readily stored in a database from which they can be retrieved and operated on further if desired. For example, the coordinates of the points where the clipping plane intersects the volume are readily calculated and stored. Thus, the analytical information pertaining to the clipping operation is available for subsequent use.

In addition, in accordance with the present embodiment of the present invention, the information required to connect vertices in order to form tetrahedrons to accurately render a clipped volume is already computed and stored in one or more LUTs. Because the information is already computed, it is not necessary to repeatedly perform complex and time consuming geometry calculations. Thus, the clipping operation can be performed quickly and efficiently.

Accordingly, the present invention also permits complex objects, such as concave objects, to be rendered after clipping. As explained in conjunction with FIG. 6, multiple clipping planes can be used to clip an object. To represent a complex object, the volume is clipped multiple times by different clipping planes having different orientations, and the results of each clipping operation are stored. Thus, in essence, the volume is reduced to a number of pieces. Selected pieces can then be overlaid and assembled to render an object having a complex shape, such as a concave object.

In the present embodiment of the present invention, the clipping operation is performed using the geometry of the rendered volume before the geometry information is sent to the graphics program. Thus, in some cases, the number of geometry calculations that need to be performed by the graphics program can be reduced.

The preferred embodiment of the present invention, method for virtual clipping a three-dimensional graphics image, is thus described. While the present invention has been described in particular embodiments, it should be appreciated that the present invention should not be construed as limited by such embodiments, but rather construed according to the following claims.

What is claimed is:

1. A method for generating a three-dimensional computer graphics image, said method comprising the steps of:
   a) rendering a volume representing said image using a plurality of three-dimensional geometric shapes;
   b) intersecting a geometric shape from said plurality of three-dimensional geometric shapes with a planar surface which divides said geometric shape into a first subvolume and a second subvolume, wherein a vertex is created at an intersection of said planar surface and an edge of said geometric shape;
   c) grouping each vertex of said geometric shape lying on one side of said planar surface into a first group;
   d) using said first group to select a first set of instructions; and
   e) connecting vertices in said first group and said vertex created at said intersection of said planar surface and said edge of said geometric shape according to said first set of instructions to form three-dimensional geometric shapes rendering said first subvolume.

2. The method for generating a three-dimensional computer graphics image as recited in claim 1 wherein said plurality of geometric shapes comprises tetrahedrons.

3. The method for generating a three-dimensional computer graphics image as recited in claim 1 wherein said step c) comprises:
   c1) assigning a first binary value to each vertex of said geometric shape lying on one side of said planar surface; and
   c2) grouping vertices assigned said first binary value into said first group.

4. The method for generating a three-dimensional computer graphics image as recited in claim 1 wherein each vertex of said geometric shape is designated by a unique identifier.

5. The method for generating a three-dimensional computer graphics image as recited in claim 4 wherein said steps c) and d) comprise:
   grouping into said first group said unique identifier for each vertex of said geometric shape lying on one side of said planar surface to create a combination of unique identifiers; and
   using said combination of unique identifiers to select said first set of instructions.

6. The method for generating a three-dimensional computer graphics image as recited in claim 1 wherein said first set of instructions are in a lookup table.

7. The method for generating a three-dimensional computer graphics image as recited in claim 1 wherein said first set of instructions specify which edges of said geometric shape are intersected by said planar surface.

8. The method for generating a three-dimensional computer graphics image as recited in claim 1 wherein said steps c)–e) further comprise the steps of:
   grouping each vertex of said geometric shape lying on the other side of said planar surface into a second group;
   using said second group to select a second set of instructions; and
   connecting vertices in said second group and said vertex created at said intersection of said planar surface and said edge of said geometric shape according to said second set of instructions to form three-dimensional geometric shapes rendering said second subvolume.

9. A computer system comprising:

a bus;

a processor coupled to said bus; and a computer-readable memory unit coupled to said bus;

said processor for performing a method for generating a three-dimensional computer graphics image, said method comprising the steps of:

a) rendering a volume representing said image using a plurality of three-dimensional geometric shapes;

b) intersecting a geometric shape from said plurality of three-dimensional geometric shapes with a planar surface which divides said geometric shape into a first subvolume and a second subvolume, wherein a vertex is created at an intersection of said planar surface and an edge of said geometric shape;

c) grouping each vertex of said geometric shape lying on one side of said planar surface into a first group;

d) using said first group to select a first set of instructions; and e) connecting vertices in said first group and said vertex created at said intersection of said planar surface and said edge of said geometric shape according to said first set of instructions to form three-dimensional geometric shapes rendering said first subvolume.

10. The computer system of claim 9 wherein said processor performs said method for generating a three-dimensional computer graphics image wherein said plurality of geometric shapes comprises tetrahedrons.

11. The computer system of claim 9 wherein said processor performs said method for generating a three-dimensional computer graphics image wherein said step c) comprises:

c1) assigning a first binary value to each vertex of said geometric shape lying on one side of said planar surface; and c2) grouping vertices assigned said first binary value into said first group.

12. The computer system of claim 9 wherein said processor performs said method for generating a three-dimensional computer graphics image wherein each vertex of said geometric shape is designated by a unique identifier.

13. The computer system of claim 12 wherein said processor performs said method for generating a three-dimensional computer graphics image wherein said steps c) and d) comprise:

grouping into said first group said unique identifier for each vertex of said geometric shape lying on one side of said planar surface to create a combination of unique identifiers; and using said combination of unique identifiers to select said first set of instructions.

14. The computer system of claim 9 wherein said processor performs said method for generating a three-dimensional computer graphics image wherein said first set of instructions are in a lookup table.

15. The computer system of claim 9 wherein said processor performs said method for generating a three-dimensional computer graphics image wherein said first set of instructions specify which edges of said geometric shape are intersected by said planar surface.

16. The computer system of claim 9 wherein said processor performs said method for generating a three-dimensional computer graphics image wherein said steps c)–e) further comprise the steps of:

grouping each vertex of said geometric shape lying on the other side of said planar surface into a second group;

using said second group to select a second set of instructions; and connecting vertices in said second group and said vertex created at said intersection of said planar surface and said edge of said geometric shape according to said second set of instructions to form three-dimensional geometric shapes rendering said second subvolume.

17. A computer-usable medium having computer-readable program code embodied therein for causing a computer system to perform the steps of:

a) rendering a volume representing said image using a plurality of three-dimensional geometric shapes;

b) intersecting a geometric shape from said plurality of three-dimensional geometric shapes with a planar surface which divides said eometric shape into a first subvolume and a second subvolume, wherein a vertex is created at an intersection of said planar surface and an edge of said geometric shape;

c) grouping each vertex of said geometric shape lying on one side of said planar surface into a first group;

d) using said first group to select a first set of instructions; and e) connecting vertices in said first group and said vertex created at said intersection of said planar surface and said edge of said geometric shape according to said first set of instructions to form three-dimensional geometric shapes rendering said first subvolume.

18. The computer-usable medium of claim 17 wherein said plurality of geometric shapes comprises tetrahedrons.

19. The computer-usable medium of claim 17 wherein said computer-readable program code embodied therein causes a computer system to perform the steps of:

c1) assigning a first binary value to each vertex of said geometric shape lying on one side of said planar surface; and c2) grouping vertices assigned said first binary value into said first group.

20. The computer-usable medium of claim 17 wherein each vertex of said geometric shape is designated by a unique identifier.

21. The computer-usable medium of claim 20 wherein said computer-readable program code embodied therein causes a computer system to perform the steps of:

grouping into said first group said unique identifier for each vertex of said geometric shape lying on one side of said planar surface to create a combination of unique identifiers; and using said combination of unique identifiers to select said first set of instructions.

22. The computer-usable medium of claim 17 wherein said first set of instructions are in a lookup table.

23. The computer-usable medium of claim 17 wherein said first set of instructions specify which edges of said geometric shape are intersected by said planar surface.

24. The computer-usable medium of claim 17 wherein said computer-readable program code embodied therein causes a computer system to perform the steps of:

grouping each vertex of said geometric shape lying on the other side of said planar surface into a second group;

using said second group to select a second set of instructions; and connecting vertices in said second group and said vertex created at said intersection of said planar surface and said edge of said geometric shape according to said second set of instructions to form three-dimensional geometric shapes rendering said second subvolume.

* * * * *